Patented June 17, 1952

2,600,719

UNITED STATES PATENT OFFICE 2,600,719

SEAWATER DESALTING COMPOSITION

William Wood, Philadelphia, Pa., assignor to The Permutit Company, New York, N. Y., a corporation of Delaware No Drawing. Application December 6, 1949, Serial No. 131,497

5 Claims. (Cl. 252—189)

This invention relates to chemicals for desalting seawater, and more particularly to a mixture of such chemicals in the form of a briquet.

Various devices and means have been proposed for converting seawater into potable water under emergency conditions, such as when a person is shipwrecked or an aviator is forced down at sea. One of the most effective means has been the chemical treatment of the water with materials which react with the sodium chloride and other salts in the water to form insoluble products and thus render the seawater potable. Because equipment of this sort is only needed in an emergency and frequently has to be carried in an aviator's emergency kit, every effort must be made to keep the weight and volume of materials used at a minimum.

One particular form of chemical kit that has been used with great success includes the desalting chemicals in the form of briquets of convenient size, and a plastic bag of special construction having at one end a tube for drawing off the treated water through a built-in filter. In operation, a measured amount of seawater is first placed in the bag along with a briquet of the chemicals, the bag is closed and manipulated and agitated for a sufficient time to produce disruption of the briquet and a reasonably complete reaction of the chemicals with the salts in the seawater. After the desired period for reaction, the treated water is sucked out of the bag through the filter and tube.

Such kits were made practical by the development of a special synthetic cation exchange material or zeolite of unusually high exchange capacity which has been used in the form of a silver zeolite as the principal constituent of the briquets. This synthetic zeolite is prepared as a sodium alumino silicate gel which is processed and treated to give it as high a capacity as possible and is then converted into the silver zeolite by treatment with a solution of a silver salt. Small quantities of other materials have been mixed with this silver zeolite, the addition and amount of these materials depending upon the type of chemical treatment desired. For example, a small amount of barium hydrate has been employed in order to reduce the sulfate content of the seawater treated. A small amount of silver oxide has been used to cause precipitation or fixing of some of the magnesium in the water. A small amount of activated carbon has also been employed to improve the odor and taste of the treated water and a lubricant such as stearic acid has also been used in small quantities to facilitate briqueting.

Mixtures of the foregoing chemicals with the silver zeolite constituting at least about 85% of the total can be compressed into a small space under a pressure of the order of 6 to 30 tons per square inch. However, a briquet thus produced does not easily break up when placed in water and it has been found necessary to include in the composition a disruptor material to facilitate breaking up the briquet in water. One of the principal materials that has been employed as a disruptor has been bentonite, but bentonite and fuller's earth are chemically inert, so far as desalting seawater is concerned, and they increase the volume and weight of the briquet in proportion to the amount added. Such materials must be kept to a minimum because of their inertness, but on the other hand have to be used in sufficient amounts to produce a reasonably rapid disruption action. Also, materials such as bentonite and fuller's earth have a tendency to clog or partially block the filter through which the treated water is drawn off and thus increase the time required for filtering.

An object of this invention is to provide a disruptor for these briquets that is not chemically inert but that contributes to the desired desalting.

A further object is to provide a briquet including in addition to the inorganic silver zeolite a silver cation exchange resin which, because of its chemical activity and physical form, may be used in sufficient quantities to produce briquets that are disrupted or crumbled much more quickly and easily when placed in the seawater without substantially reducing the filterability of the water or the desalting capacity of the briquet.

I have found that the usual seawater desalting briquets of chemicals may be greatly improved by using as a disruptor a quantity of silver cation exchange resin, preferably a material of high exchange capacity. Such a material, because it is an active desalting ingredient itself, can be admixed with the inorganic silver zeolite and other constituents of the briquet in fairly high proportions without decreasing to any great extent the desalting capacity of the briquet. Such an addition not only is advantageous chemically compared with inert disruptors but because of its physical properties actually produces far superior and quicker disruption of the briquet than could be obtained with the largest amounts of the inert materials that are practical to use. Because of its high cation exchange capacity and desirable physical properties, I have found that sulfonated styrene-divinyl benzene copolymer cation exchange resin treated with a silver nitrate solution is particularly well suited for use as a disruptor in these briquets.

In general, I prefer to use an amount of silver cation exchange resin of the order of 1 to 10% of the weight of the briquet. It is better not to use too large a proportion of the resin and, in fact, if the amount of silver cation exchange resin exceeds 70% of the weight of the total briquet, it is extremely difficult, if not impossible, to form the briquet into a mixture that does not crumble or laminate upon removal from the press. If the amount of resin employed is less than ½% of the total briquet weight, the disruption time of the briquet is increased considerably. On the other hand, the effective exchange capacity of the synthetic cation exchange resins is not as high as that of the specially prepared silver alumino silicate zeolites commonly used in this briquet. Therefore, the best results are obtained when sufficient resin is used to produce rapid disruption of the briquets in seawater without using so much of the resin as to provide what might be considered an excess for practical purposes.

The cation exchange resin selected should, of course, be one that measures up to the standards of high quality cation exchangers with respect to insolubility, capacity for cation exchange reactions and the like. The resin may be used in particles of various sizes although it is advantageous from the standpoint of both briqueting and disruption if the resin, which is normally made in the form of spherical beads of larger size, is ground to a size of minus 100 mesh.

The inorganic silver zeolite with which the silver cation exchange resin is mixed is preferably material that is specially prepared for its high exchange capacity. The preparation of such a material is described in Calmon Patent No. 2,512,053, issued June 20, 1950, and may be referred to herein as a "stewed" silver alumino silicate. For some reason, which is not entirely understood, it is easier to obtain satisfactory briqueting using this "stewed" alumino silicate as the silver zeolite than with other inorganic zeolites.

The inorganic silver zeolite and the silver cation exchange resin are simply mixed together in the desired proportion in any suitable manner. The other ingredients such as silver oxide, barium hydrate, activated carbon and a lubricant such as stearic acid may or may not be incorporated with this mixture of cation exchange materials. If used, the order in which these various ingredients are mixed together is not important as long as a reasonably uniform mixture is obtained before it is introduced into the press to be briqueted.

Reference has been made to the advantage of using a chemically active material instead of a chemically inert material as a disruptor. In addition, I have found that the silver cation exchange resin actually produces more satisfactory and more rapid disruption of the briquets than the use of an inert material such as bentonite which has commonly been used heretofore for this purpose. In addition, the filterability of a treated seawater does not limit the amount of disruptor that can be used when the silver cation exchange resin is employed for this purpose as it does when a material such as bentonite or fuller's earth is employed.

The following examples are given in order to illustrate these distinctions. In order to obtain a basis for comparison, a standard procedure has been adopted for measuring disruption and filterability. This procedure is as follows:

A measured quantity of standard composition seawater and a briquet of chemicals to be tested are placed in the bag of a desalting kit and the time necessary for the briquet to disrupt is recorded. This time of disruption is determined as the time interval from the introduction of the briquet to the time when it appears that lumps or hard pieces are no longer present in the mixture. Little or no manipulation is applied to the briquet during this time. After disruption of the briquet, the contents of the desalting bag are kneaded for ten minutes and then placed on the shaking wheel so that the total time from the time of introduction of the briquet until removal from the shaking wheel is one hour. The bag and contents are then properly supported and the tube from the filter is attached to a suction flask, the suction applied corresponding to about 150 mm. of mercury. The total time for the filtration is recorded and the volume of the filtrate is measured.

*Example 1.*—A briquet was prepared containing the following ingredients in the following amounts:

|  | Grams |
| --- | --- |
| Silver cation exchange resin | 1.3 |
| Silver alumino silicate | 62.3 |
| Stearic acid | 0.8 |
| Activated carbon | 0.2 |
| Barium hydrate | 3.5 |
| Total | 68.1 |

The silver cation exchange resin was a sulfonated styrene-divinyl benzene copolymer which was crushed to about 100 mesh and converted to the silver exchanging condition by soaking in silver nitrate solution, rinsed and then dried. The silver alumino silicate was a material made by the "stewing" technique described in said Calmon application, converted to the silver exchanging condition and crushed to pass through a 50 mesh sieve. These ingredients were mixed dry and compressed under a pressure of about 12–16 tons per square inch to form a briquet about 3.0 cubic inches in volume.

This briquet, containing slightly less than 2% of the resin, gave a disruption time in the standard test of 2.5 minutes and a filtration time of 20 minutes for 450 ml. of treated water.

As contrasted with this, various briquets made by the same procedure and of the same composition but using 1.5 g. of bentonite as a disruptor instead of the resin or, in other words, slightly over 2% of bentonite, showed disruption times of around 6 to 9 minutes and filtration times of 38 to 60 minutes for a comparable volume of filtrate.

*Example 2.*—Other briquets were prepared of the same size and total weight as the first composition given in Example 1, but the amount of the resin was increased in each case and the amount of the alumino silicate was correspondingly decreased. Briquets made of these materials containing approximately 3, 5, 7 and 10% by weight, respectively, of the resin gave the following performances.

| Per cent of resin | 3 | 5 | 7 | 10 |
| --- | --- | --- | --- | --- |
| Disruption time (minutes) | 2.5 | 1.25 | 1 | 0.5 |
| Filtration time (minutes) | 18 | 20 | 20 | 20 |
| Filtration volume | 460 | 455 | 450 | 450 |

It will be apparent from the foregoing that the use of a silver cation exchange resin instead of an inert material such as bentonite reduces the time of disruption or disintegration of a briquet in seawater and reduces the time of filtration of the water in addition to the fact that such a resin is chemically active instead of inert. Because of this chemical activity, a briquet containing a silver cation exchange resin instead of an inert material as a disruptor is much more effective for its size and weight so far as desalting seawater is concerned.

The terms and expression which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. A compressed briquet of finely divided chemicals for desalting seawater containing silver cation exchange material as its principal active reagent, said material consisting of a mixture of a synthetic silver alumino silicate which is made by heating the material in gel form before drying and converting to the silver condition, and water insoluble silver cation exchange resin, the amount of said resin comprising from about 0.5 to about 70% of the weight of the briquet.

2. A briquet as defined in claim 1 in which the resin is a styrene-divinyl benzene copolymer.

3. A compressed briquet of finely divided chemicals for desalting seawater containing silver cation exchange material as its principal active reagent, said material consisting of a mixture of a synthetic silver alumino silicate which is made by heating the material in gel form before drying and converting to the silver condition, and water insoluble silver cation exchange resin, the amount of said resin comprising from about 1 to about 10% of the weight of the briquet.

4. A compressed briquet of finely divided chemicals for desalting seawater containing silver cation exchange materials as its principal ingredient, said materials consisting of finely divided synthetic silver alumino silicate which is made by heating the material in gel form before drying and conventing to the silver condition, and water insoluble synthetic silver cation exchange resin ground to —100 mesh, the amount of resin comprising from about 0.5 to about 70% of the weight of the briquet.

5. A compressed briquet of finely divided chemicals for desalting seawater which comprises as its principal ingredients a mixture of inorganic silver alumino silicate zeolite with a substantial quantity not exceeding 70% by weight of the mixture of a high capacity water in soluble silver cation exchange resin.

WILLIAM WOOD.

REFERENCES CITED

The following references are of record in the file of this patent:

UNITED STATES PATENTS

| Number | Name | Date |
|---|---|---|
| 2,066,271 | Irwin | Dec. 29, 1936 |
| 2,366,007 | D'Alelio | Dec. 26, 1944 |
| 2,500,113 | Banks | Mar. 7, 1950 |
| 2,512,053 | Calmon | June 20, 1950 |

OTHER REFERENCES

Nachod Ion Exchange (1949), pages 159–166, Academic Press, New York.